United States Patent [19]

Malik et al.

[11] Patent Number: 5,080,121
[45] Date of Patent: Jan. 14, 1992

[54] PROCESS FOR THE PREPARATION OF A NEW POLYMER USEFUL FOR DRAG REDUCTION IN HYDROCARBON FLUIDS IN EXCEPTIONALLY DILUTE POLYMER SOLUTIONS

[75] Inventors: Sanjay Malik; Satish N. Shintre; Raghunath A. Mashelkar, all of Maharashtra, India

[73] Assignee: Council of Scientific & Industrial Research, New Delhi, India

[21] Appl. No.: 563,447

[22] Filed: Aug. 6, 1990

[51] Int. Cl.$^5$ .............................. F17D 1/16
[52] U.S. Cl. ............................ 137/13; 523/175; 576/240; 576/265
[58] Field of Search ............... 526/240, 265; 523/175; 137/13

[56] References Cited

FOREIGN PATENT DOCUMENTS 0077164 4/1983 European Pat. Off. .
2420212 9/1975 Fed. Rep. of Germany .
60-202109 10/1985 Japan .

*Primary Examiner*—Joseph L. Schofer
*Assistant Examiner*—M. Nagumo
*Attorney, Agent, or Firm*—Ladas & Parry

[57] ABSTRACT

Novel polymer for drag reduction in hydrocarbon fluids is disclosed which comprises polymerising a C-12 to C-18 acrylate or methacrylate monomer and an ionic with or without other monomers acting as fillers or additives at a temperature between 20° and 30° C. with constant stirring and separating the resultant polymer. The preparation of the polymers is simple, shear stability is good even at high shear rates, insensitivity to the presence of any other polar solvent and good solubility in almost all the hydrocarbon liquids. The novel polymer reduces friction in the flow of a hydrocarbon fluid by a factor around 5 at concentrations as low as 1 to 25 ppm.

18 Claims, 1 Drawing Sheet

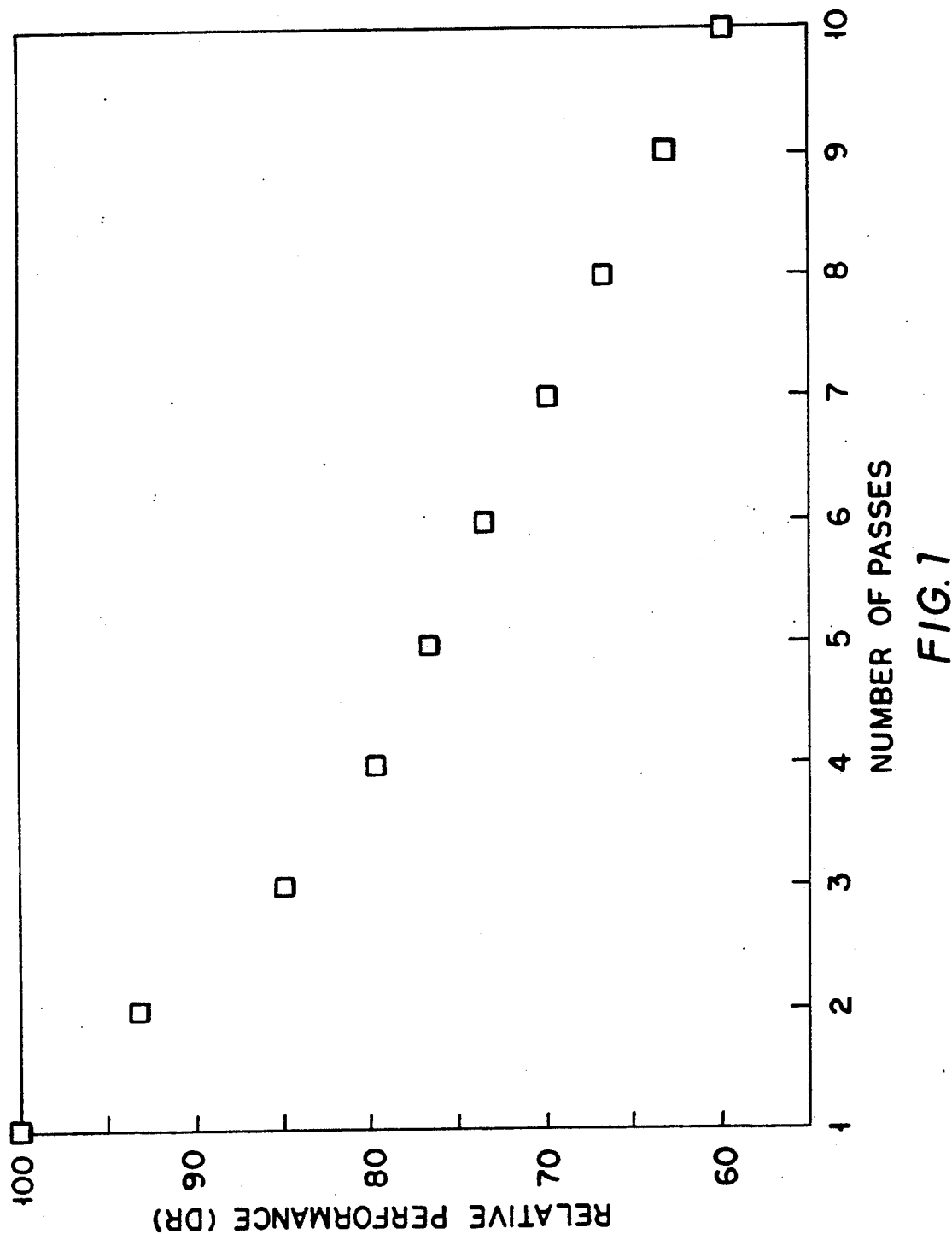

PROCESS FOR THE PREPARATION OF A NEW POLYMER USEFUL FOR DRAG REDUCTION IN HYDROCARBON FLUIDS IN EXCEPTIONALLY DILUTE POLYMER SOLUTIONS

This invention relates to a process for the preparation of a novel polymer useful for drag reduction in hydrocarbon fluids in exceptionally dilute polymer solutions.

In the pipe line transportation of fluids, there is drop in fluid pressure due to friction at pipe wall. Therefore, for a given pipe line, fluid must be transported with sufficient pressure to achieve the desired throughput. Since the pressure drops with the increase in flow rate, more pressure must be applied to increase the flow rate. There are design limitations for a given pipe line to withstand higher levels of pressure. However, when the flow is turbulent in pipe lines, flow rate can be enhanced by the addition of high molecular weight polymeric additives. The role of these additives is to suppress the growth of turbulent eddies, which results in higher flow rate at a constant pumping pressure. The phenomenon is described as drag reduction and can be used to boost flows of crude oil and other hydrocarbon liquids in commercial pipe lines.

Use of polymeric additives for drag reduction is known. Polymers based on alpha-olefins and other diene monomers have been reported to reduce drag in commercial pipe lines. For example reference is made to U.S. Pat. Nos. 3,559,664 (1971), 3,827,447 (1974), 3,857,402 (1974) and 3,865,124 (1975). Use of polymers based on vinyl monomers and co-monomers has also been reported. Reference is also made to Polymer Engineering And Science, Mid-May, 1980, Vol. 20, No. 7. Some reports are available in which interpolymer complexes have been used as drag reducers. Reference is made to U.S. Pat. No. 4,508,128 (1985).

Processes involving use of poly alpha-olefins suffer from the following drawbacks:
1. Shear stability of the polymers is poor.
2. Requires elaborate technique for the manufacture of polymers.
3. Cost of the polymeric additive is high.

Use of acrylate polymers, for pipe line transportation is not commercially attractive as they are required in higher concentrations for effective drag reduction.

Polymers based on intermolecular complexes, are reported to perform at concentrations of 250 to 1000 ppm, which is quite high for commercial purposes. Moreover, such polymers are sensitive to the presence of any polar co-solvent i.e. they may lose their drag reduction activity in the presence of such solvents.

The primary advantage of the new polymer of the invention is that it reduces friction in the flow of a hydrocarbon fluid by a factor of around 5 at concentrations as low as 1 to 25 parts per million by weight, for instance, drag reduction of 76% in diesel at 25 parts per million by weight.

Another advantage is the simple method of producing the polymer i.e. by polymerization technique which yields a linear and high molecular weight product.

Yet another advantage is the good solubility of the polymer in almost all the hydrocarbon liquids including benzene, toluene, xylene, diesel, kerosene, gasoline and crude oil.

A further advantage is the polymer's insensitivity to the presence of any other polar co-solvents e.g. n-butyl alcohol up to 10% by volume.

Yet a further advantage is that the polymer is shear stable even at high shear rates that is, the additive does not lose its drag reduction effectiveness at high shear rates.

The object of the invention is to provide a process for the preparation of a novel polymer useful for drag reduction in hydrocarbon fluids which overcomes the drawbacks hereinbefore outlined.

Accordingly, the present invention provides a process for the preparation of a new polymer useful for drag reduction in hydrocarbon fluids which comprises polymerizing a C-12 to C-18 acrylate or methacrylate monomer and an ionic monomer with or without other monomers acting as fillers or additives, at a temperature between 20° and 30° C. with constant stirring and separating the resultant polymer.

The ionic monomer used in the process of the present invention may be selected from the following and the like: sodium acrylate; sodium methacrylate; 4-vinyl sodium benzoate and 4-vinyl pyridinium salts of iodide, chloride and acetate.

Any C-12 to C18 acrylate or methacrylate ester individually or in combination can be used. The quantity of the ester monomer in the polymer should be more than 40%. Concentration of the ionic monomer per hundred grams of the terpolymer can vary between 0.05 moles and 0.1 moles.

Monomers acting as fillers or additives may be selected from styrene monomers, acrylate monomers having less than 12 carbon atoms and vinyl monomers.

The process of the present invention can be effected by conventional methods. For example, it can be effected by subjecting the monomers in the presence of deionized water, a water soluble initiator and an emulsifier to the step of polymerization, at a temperature between 20° and 30° and at a pH between 4 and 6, with agitation.

The polymerization may be effected in the presence of 0.2 to 0.6 per cent by weight of monomers of initiators such as potassium bromate/sodium sulphate, a combination of potassium persulphate with ferrous sulphate and sodium meta bisulphite and 4 to 12 per cent by weight of monomers of emulsifiers such as sodium lauryl sulphate, Triton X-100.

The speed of agitation can be maintained between 250 and 400 rpm. The polymer can be isolated by known methods by either heating the emulsion at about 60° to 70° C. under vacuum or by direct precipitation in a non-solvent such as methanol. The coagulated polymer is filtered and dried at about 60° C. under vacuum. Such dried polymer is dissolved in a suitable hydrocarbon liquid in concentrations between 5 and 12 grams of polymer per 100 ml of hydrocarbon liquid.

The reduced viscosity of 0.5% solution of the polymer should be more than 22 dl/g as determined by Cannon-Ubblehode dilution viscometer, using toluene as solvent at 25° C.

The required concentration of polymer in hydrocarbon liquid for effective drag reduction can be between 1 and 25 parts per million by weight of the polymer.

The extent of drag reduction by the polymer is evaluated in a pipe loop by measuring pressure drops due to the flow of hydrocarbon liquid and due to that of 1.0 to 25 ppm solution of polymer in hydrocarbon liquid.

The invention is described with reference to the following examples which should not be construed to limit &he scope of the invention :

EXAMPLE 1

45 gram dodecyl methacrylate
50 gram styrene
5 gram sodium methacrylate
275 ml. distilled water
12 gram Triton X-100
0.2 gram potassium persulphate
0.2 gram sodium meta bisulphite
0.001 gram $FeSO_4$ To a clean 500 ml reactor, all the above ingredients were charged (except the initiator system) under the positive pressure of nitrogen. After an hour of nitrogen bubbling, the initiator system was introduced to the reactor under agitation. The reaction was continued for 6 hours, maintaining the temperature at 25° C. After the reaction was complete, the polymer was precipitated from the emulsion in cold methanol. The resulting polymer was filtered and dried under vacuum at 60° C. for 4 hours. Yield of isolated polymer was more than 98%.

The polymer yielded is Poly (dodecyl methacrylate-styrene-sodium methacrylate). The polymer was dissolved in toluene in concentration of about 10 gram polymer per 100 ml. of toluene by allowing the polymer to swell in the solvent for 7 days.

FIG. 1 of the drawings accompanying the specifications gives the relative performance of drag reduction of a 10 ppm solution of the terpolymer in kerosene. It can be seen from the figure that the polymer retains about 60% of its performance even after ten passes in a 50 cm. long capillary of 3 mm diameter at a typical wall shear rate of 10,500 per second.

The performance of the polymer was evaluated by pumping a solution of known concentration of the polymer of this invention in a hydrocarbon fluid through a 9.3 mm. diameter pipe loop. Pressure drops were monitored across 30 cm. straight segment of the pipe by means of differential pressure transmitter. Flow rates were measured by means of a mechanical vane type of flow meter.

Percent drag reduction was calculated using the following equation:

$$\% \text{ Drag Reduction} = \frac{\text{Pressure drop with solvent} - \text{Pressure drop with solution}}{\text{Pressure drop with solvent}} \times 100$$

Pressure drop is measured at a constant volumetric flow rate. The results are tabulated in Table 1.

TABLE 1

Drag reduction data at various additive concentrations.

| Polymer concentration (ppm) | Reynolds number | Liquid | Drag Reduction |
| --- | --- | --- | --- |
| 01 | 27,000 | xylene | 28 |
| 25 | 11,000 | kerosene | 53 |
| 10 | 11,000 | kerosene | 34 |
| 05 | 28,000 | diesel/kerosene | 30 |
| 25 | 28,000 | diesel/kerosene | 76 |

EXAMPLE 2

41.75 gram dodecyl methacrylate
50 gram styrene
8.25 gram vinyl pyridinium acetate
275 ml distilled water
12 gram Triton X-100
0.2 gram potassium persulphate
0.2 gram sodium meta bisulphite
0.001 gram $FeSO_4$ The polymer yielded is Poly (dodecyl methacrylate-styrene-vinyl pyridinium acetate).

The procedure for the preparation of the polymer is essentially the same as described in Example 1.

Drag reduction characteristics of the polymer were studied by the method explained in Example 1 and the results are tabulated in Table 2.

TABLE 2

Drag reduction data at various additive concentrations.

| Polymer concentration (ppm) | Reynolds number | Liquid | Drag Reduction |
| --- | --- | --- | --- |
| 05 | 28,000 | diesel/kerosene | 34 |
| 10 | 27,000 | xylene | 38 |
| 10 | 11,000 | kerosene | 34 |

We claim:

1. A process for the preparation of a polymer useful for drag reduction in a hydrocarbon fluid, said process comprising polymerizing monomers consisting essentially of a C-12 to C-18 acrylate or methacrylate monomer and an ionic monomer with or without other monomers acting as fillers or additives, which ionic monomer and other monomers do not substantially impair the usefulness of said polymer for said drag reduction, said ionic monomer being selected from the group consisting of sodium acrylate; sodium methacrylate; 4-vinyl sodium benzoate and 4-vinyl pyridinium salts of iodide, chloride and acetate and being present in an amount of between about 0.05 to 0.1 moles per hundred grams of the polymer, said polymerization being effected at a temperature between 20° and 30° C. with constant stirring whereupon said monomers form a linear polymer which is soluble in said hydrocarbon fluid and useful for said drag reduction, said process further comprising recovering the resultant linear polymer.

2. The process as claimed in claim 1, wherein the amount of acrylate or methacrylate monomer in the polymer is more than 40% by weight.

3. The process as claimed in claim 1, wherein the polymerization is effected using initiators selected from a combination of potassium persulphate, ferrous sulphate, and sodium meta bisulphite or a combination of potassium bromate, sodium sulphate and potassium persulphate or any other known water soluble Redox initiator systems.

4. The process as claimed in claim 1, wherein the polymerization is effected using emulsifiers selected from sodium lauryl sulphate, or any other known water soluble non-ionic emulsifiers.

5. The process as claimed in claim 3, wherein the amount of initiator ranges from 0.2 to 0.6 per cent by weight of monomer.

6. The process as claimed in the claim 4, wherein the amount of emulsifier ranges from 4 to 12 per cent by weight of monomer.

7. The process as claimed in claim 1, wherein the polymerization is effected at a pH of 4 to 6.

8. The process as claimed in claim 1, wherein the monomers acting as fillers or additives are selected from styrene monomers, acrylate monomers having less than 12 carbon atoms and vinyl monomers.

9. A novel polymer produced by the process of claim 1.

10. A novel polymer produced by the process of claim 2.

11. A process for the preparation of an agent which reduces drag in a hydrocarbon fluid, said process consisting essentially of (a) polymerizing monomers consisting essentially of a C-12 to C-18 acrylate or methacrylate monomer and an ionic monomer with or without other monomers acting as fillers are additives, said ionic and other monomers being such that they do not substantially impair the usefulness of said polymer for drag reduction, said ionic monomer being selected from the group consisting of sodium acrylate; sodium methacrylate; 4-vinyl sodium benzoate and 4-vinyl pyridinium salts of iodide, chloride and acetate and being present in an amount of between about 0.05 to 0.1 moles per hundred grams of the polymer, said polymerization being effected at a temperature between 20° and 30° C. with constant stirring whereupon said monomers form a linear polymer which is soluble in said hydrocarbon fluid and useful for said drag reduction, and (b) recovering the resultant linear polymer.

12. The process as in claim 11, wherein the hydrocarbon fluid is benzene, toluene, xylene, diesel, kerosene, gasoline, or crude oil.

13. A novel polymer produced by the process of claim 11.

14. A process for reducing friction in the flow of a hydrocarbon fluid by adding a polymer of high molecular weight to the fluid, the process comprising forming said polymer by polymerizing a C-12 to C-18 acrylate or methacrylate monomer and an ionic monomer to form a resultant polymer which is linear and soluble in said fluid, said ionic monomer being selected from the group consisting of sodium acrylate; sodium methacrylate; 4-vinyl sodium benzoate and 4-vinyl pyridinium salts of iodide, chloride and acetate and being present in an amount of between about 0.05 to 0.1 mole per hundred grams of the resultant polymer, said polymerization being effected at a temperature between 20° C. and 30° C. with constant stirring, recovering the resultant polymer, and dissolving the resultant polymer in a solvent comprising said hydrocarbon fluid whereby to reduce friction in the flow of said fluid.

15. The process as claimed in claim 14, wherein said acrylate or methacrylate monomer is present in said resultant polymer in an amount of more than 40% by weight.

16. The process as claimed in claim 15, wherein the polymerization of the acrylate or methacrylate monomer and the ionic monomer is carried out in the presence of a monomer acting a filled or additive which does not substantially impair the ability of said resultant polymer to reduce friction in the flow of said fluid, such that the polymerization results in the formation of a terpolymer which includes said filler or additive.

17. The process as claimed in claim 16 wherein the resultant polymer is dissolved in said hydrocarbon fluid at a concentration of between 1 to 25 parts per million.

18. The process as claimed in claim 17 wherein said solvent further comprises a polar co-solvent in an amount of up to 10% by volume.

* * * * *